Nov. 24, 1970   H. A. ENGE   3,543,136
HIGH VOLTAGE DIRECT CURRENT GENERATOR
Filed Jan. 21, 1969   3 Sheets-Sheet 1

INVENTOR.
HARALD A. ENGE
BY

Nov. 24, 1970  H. A. ENGE  3,543,136
HIGH VOLTAGE DIRECT CURRENT GENERATOR
Filed Jan. 21. 1969  3 Sheets-Sheet 3

INVENTOR.
HARALD A. ENGE
BY

United States Patent Office

3,543,136
Patented Nov. 24, 1970

3,543,136
HIGH VOLTAGE DIRECT CURRENT GENERATOR
Harald A. Enge, Winchester, Mass., assignor to the United States of America as represented by the United States Atomic Energy Commission
Filed Jan. 21, 1969, Ser. No. 792,306
Int. Cl. H02m 7/10; H01j
U.S. Cl. 321—15       4 Claims

ABSTRACT OF THE DISCLOSURE

Termination means for a high voltage direct current generator formed by a transmission line having a series of closely coupled resonance circuits wherein the termination means simply and efficiently provides a standing wave pattern which may be stationary or may be made to oscillate up and down the transmission line with a uniform voltage gradient by rectification of RF energy extracted at selected points or extracted at times of maximum amplitudes.

CROSS REFERENCE TO RELATED APPLICATIONS

Application S.N. 659,742, "Traveling Wave High Voltage Generator," filed Aug. 10, 1967, Harald A. Enge.

BACKGROUND OF THE INVENTION

This invention is an improvement of the high voltage generator referred to in the above-referenced co-pending application by the inventor of this application as a "transmission line generator," and is particularly adopted for use in charged particle accelerators that utilize electric fields produced by a D.C. power supply.

DESCRIPTION OF THE PRIOR ART

The transmission line generator described in the above-referenced patent application, comprises a series of resonance circuits that are very closely coupled in series on the D.C. side thereof, such that when the first circuit is energized by coupling it to a high-frequency oscillator, the energy will couple from one circuit to the next and, indeed, travel up the string of circuits just as on a transmission line. By tapping out part of the high-frequency power from each circuit and rectifying this tapped power a high voltage can be built up from one end of the string to the other.

One of the problems with the high voltage generator of this above-referenced patent application is that only part of the power can be tapped out because of the voltage gradient produced along the string of circuits. In this regard, the voltage across each circuit is proportional to the square root of the power left over and, therefore, by the time that half the power is consumed, the voltage is down to 71% of the initial voltage. Thus, to maintain a constant gradient, it is necessary to transmit considerably more power than is needed for the D.C. load. Moreover, the string has to be terminated with its characteristic impedance to prevent reflections from the upper end of the string or circuits since this can produce undesirable non-uniform voltage gradients along the stack of circuits. Thus, the referenced system requires complicated and expensive systems for disposing of the left-over power, which for example, transmits the left over power down to ground potential again through a second string of resonance circuits, similar to the first string but without rectifiers.

SUMMARY OF THE INVENTION

This invention was made in the course of, or under a contract with the United States Atomic Energy Commission.

This invention overcomes the above-mentioned difficulties and problems known heretofore by providing a simple and efficient means for producing a standing wave pattern that may be stationary or may be made to oscillate up and down the transmission line. In one embodiment the termination is a reactive impedance producing a stationary standing-wave pattern. The frequency and the termination impedance are so chosen that the center of the coils in the circuits are at 45°, 135°, 225°, i.e. a quarter-wave length apart. The voltage is then the same across each coil and when rectified and series-connected on the D.C. side produces a constant gradient. In another embodiment a variable terminal reactive impedance is employed to produce the standing wave pattern that oscillates up and down the transmission line. One suitable terminal reactive impedance, comprises a rotating capacitor. With a rectifier for each circuit having a large storage capacitor, current flows to the capacitor only when the voltage in that particular circuit is at its maximum. The standing-wave pattern thus can be made to oscillate up and down the transmission line by one-quarter of a wave length or more with a resulting voltage distribution that is quite uniform. In another aspect, the transmission line may be terminated with a vibrating short-circuiting relay or a relay that switches between two reactive impedances to achieve the standing wave that oscillates up and down the transmission line.

The above and further novel features of this invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE SEVERAL VIEWS OF THE DRAWING

In the drawings where like elements are referenced alike.

DETAILED DESCRIPTION

This invention is an improvement on the transmission line generator described in the above-identified co-pending patent application by the inventor of this application. As such, this invention is particularly well suited for high-power, high voltage D.C. nuclear accelerators. In this regard the apparatus and method of this invention are useful in the field of nuclear-structure physics and/or in the production of transuranium elements. However, this invention is also well suited to the fields of radiation processing, industrial and medical radiography, X-ray therapy, electron microscopes, D.C. test generators etc., comprising any of the applications where generators such as Van de Graaff generators, Dynamitrons or Cockcroft-Walton generators are useful.

Figure 1:
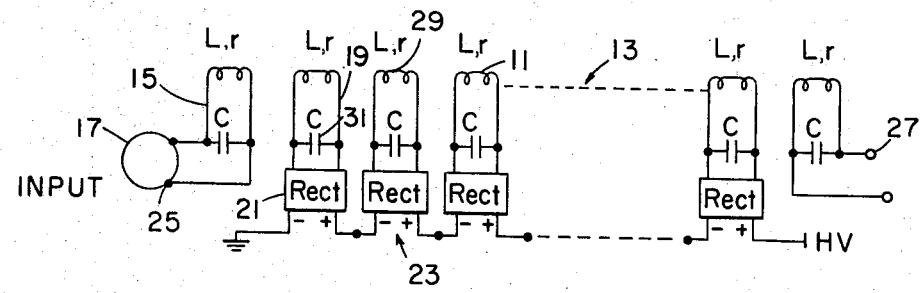
FIG. 1 is a partal schematic drawing of a transmission line generator.

The basic transmission line generator comprises a stack of coupled resonance circiuts transmitting electric power from a conventional high frequency oscillator over distances sufficiently large to insulate very high voltages, wherein A.C. power is rectified at each individual circuit, and the circuits are connected on the D.C. side to build up the D.C. voltage continuously along the stack. This power transport is illustrated in FIG. 1, which shows a series of coupled circuits 11, each with self-inductance L, capacitance C, and resistance r, which represents all the power loss and drain from the overall system 13.

The first circuit 15 connects to a conventional A.C. power source 17 of frequency in the range $f=1$–100 kc./ sec., whereby the operating frequency chosen yields optimum efficiency for the transmission line. The resonance frequency of each circuit 11 is of the same order of magnitude as the driving frequency of power source 17, although there is no requirement that the resonance and driving frequencies be equal. In operating the string 19 of tightly coupled circuits 11 as a transmission line or band-pass filter, part of the A.C. power transported up the string 19 is tapped out at each circuit 11 and rectified by conventional rectifiers 21. While all the circuits 11 are series connected on their D.C. side 23, thus building up a high D.C. voltage from end 25 to end 27 of the string 19, the A.C. voltage in each circuit 11 is low, e.g., $\leq 20$ kv. to minimize insulation problems, and voltage multiplication is employed in the rectifiers 21 for attaining high D.C. voltages per circuit 11.

Figure 2:
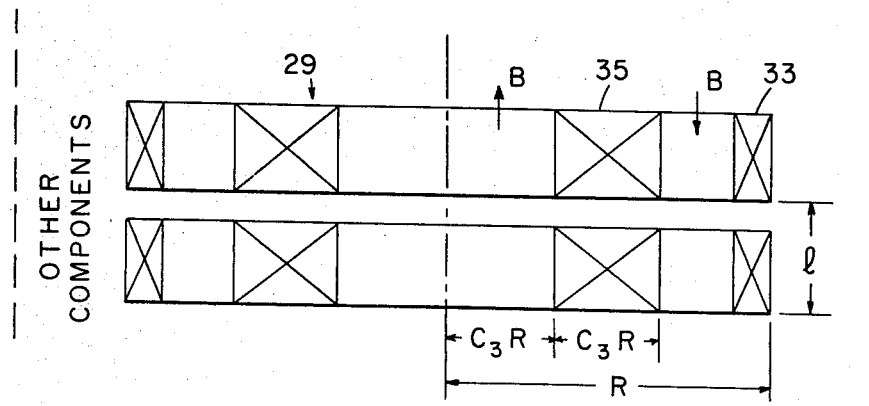
FIG. 2 is a schematic cross-section of one of the inductances of FIG. 1.

As will be understood in more detail hereinafter, the oscillations in the various coils 29 are not in phase, in the traveling-wave mode. For maximum power transport there is an optimum relationship between L, C and the frequency $p$, producing a wavelength which in practice is of the same order of magnitude as the outer diameter of a coil. For high-power transport, each inductance 29, comprises an outer coil 33 with a relatively small number of turns and an inner concentric coil 35, as shown in FIG. 2. With the proper ratio of turns in the two coils 33 and 35, no magnetic field penetrates to the region outside the outer coil 33 thereby avoiding inductive heating in the metallic parts of the capacitors 31, rectifiers 21, etc.

The EMF induced in the $n^{\text{th}}$ coil can be expressed as $$\epsilon_n = -\sum_m L_{nm} \frac{d}{dt} I_m$$

The induction coefficients $L_{nm}$ are given by
$$L_{nm} = LF(\alpha_n - x_m) = LF(x)$$

where $F(x)$ is a symmetric function that decays rapidly with increasing distance $$|x_n - x_m|$$

Figure 3:
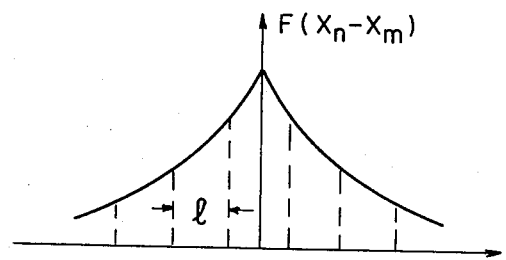
FIG. 3 is a graphic illustration of the decay function of the inductance of FIG. 2.

With flat, closely coupled coils 33 and 35, the function $F(x)$ can be approximated with $$F(x) \approx e^{-b|x|}$$

as shown in FIG. 3. For a given coil geometry, the inductance $L = c_1 \mu_0 R N^2$ henry where N is the number of turns of the inner coil 33, R is the outer radius of the assembly in meters, and $c_1$ is a constant of the order of magnitude of 1; also, this inductance can be determined by standard procedures for calculating self-inductance, as described in F. E. Terman, Radio Engineers' Handbook, McGraw-Hill, 1943. Likewise, the decay constant $b$ can be determined by standard calculations of the variation of the mutual inductance with increasing coil separation;

and the transported power P can also be determined by standard calculations. The result is $$P = \frac{3\sqrt{3}\pi}{4} \mu_0 c_1 c_2^2 c_3^2 f_{cu}^2 R^5 s^2 f$$

where $c_2 = 1/6R$, $c_3$ is defined in FIG. 2, $f_{cu}$ is the copper fill factor, and $s$ is the current density.

For flat coils with a center-to-center distance $l$ between coils $\ll R$ and with the relative dimensions as shown in FIG. 2, the inductance and coupling constants are $c_1 \approx 1$, $c_2 \approx 0.154 (c_3 = 0.36)$. For thicker coils, the inductance constant $c_1$ is smaller but the coupling constant is larger. With these numerical values, the transported power $P = 1.58 \times 10^{-8} R^5 s^2 f_{cu}^2 f$ watts where $f_{cu}$ is the copper fill factor. Because MKS units are used, the current density $s$ is in a./m.$^2$. However, if we use $s$ in a./mm.$^2$ and with R in meters, $P = 15.8 R^5 s^2 f_{cu}^2 f$ kw. Thus, in one example, for $R = 0.2$ m., $f = 10^4$, $s = 2$ a./mm.$^2$, and $f_{cu} = 0.35$, we get $P = 24.8$ kw.

As described above, the transmission line generator system of the above-referenced co-pending application prevented reflections from the upper end 27 of the string 19 of circuits 11 by terminating the string 19 with its characteristic impedance, but in accordance with this invention it has been discovered that such reflections can be used to increase the efficiency, utility, and simplicity of the system and to provide a uniform voltage gradient from end 25 to end 27 of the string 19 of circuits 11. To this end, this invention terminates the string 19 with a reactive impedance that is, in one embodiment of this invention, made variable to produce a standing-wave pattern that oscillates up and down the string 19. In another embodiment of this invention the terminating impedance is fixed.

Figure 4A:
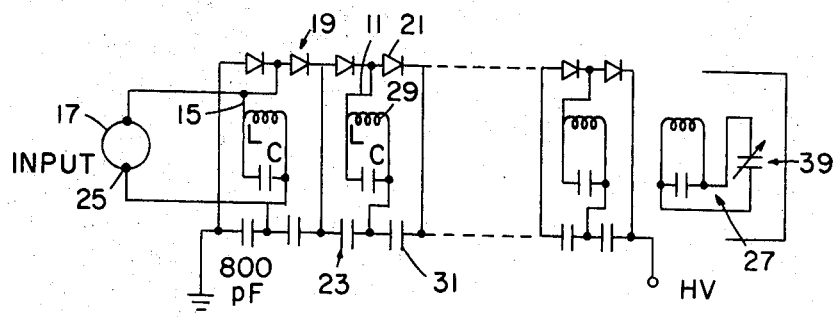
FIG. 4a is a partial schematic drawing of the transmission line generator of FIG. 1 having a terminal, variable, reactive impedance in accordance with this invention.
Figure 4B:
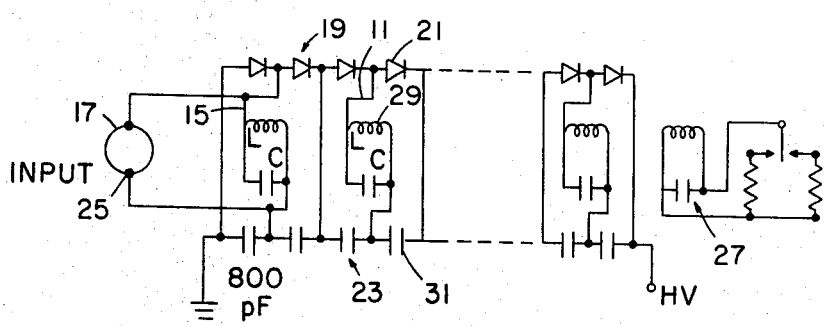
FIG. 4b is a partial schematic view of another embodiment of FIG. 4a having a vibrating short-circuiting relay that switches between two reactive impedances to form a terminal, variable, reactive impedance.

Referring now to FIG. 4a, in one embodiment a variable terminal reactance is provided in accordance with this invention by a rotating capacitor 39, while the storage capacitors 31 are made sufficiently large whereby currents only flow to the capacitors 31 when the voltages in their particular circuits 11 are at their maximum. Advantageously, the standing-wave pattern produced by the variable terminal reactance oscillates up and down string 19 by more than one-quarter of a wavelength. It will be understood, however, that string 19 can likewise be terminated at end 27 (FIG. 4b) by a vibrating short-circuiting relay or a relay that switches between two reactive impedances with essentially the same effect as described above with reference to the rotating capacitor 31 of FIG. 4a.

Figure 5:
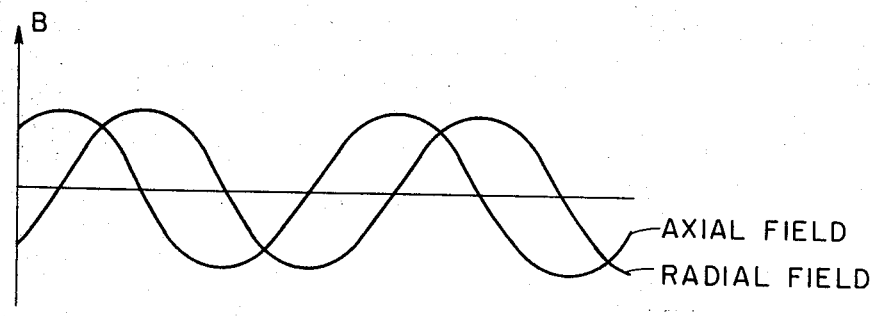
FIG. 5 is a graphic illustration of the standing wave pattern produced in the apparatus of FIG. 4 in accordance with this invention.

In operation, the standing wave field pattern produced in accordance with this invention is shown in FIG. 5. This standing wave pattern produces a higher more uniform voltage gradient than the above-described traveling wave system used heretofore. This is because, in the traveling wave device known heretofore, the voltage per coil decays up the string 19 from the ends 25 thereof according to an exponential function, whereas in the standing wave device of this invention, the antinodes are enveloped by a hyperbolic cosine with origin at end 27 of string 19. Under otherwise equal circumstances, this hyperbolic-cosine function varies less over the given distance along string 19 than does the exponential function. When the pattern oscillates up and down the line, each rectifier operates only when an antinode passes through the corresponding circuit. The result is a D.C. gradient varying as the hyperbolic-cosine function. Since all the coils 29 are in phase, the ripple voltages from the outputs of rectifiers 21 add rather than partly cancelling as in the described traveling wave system.

A relatively uniform voltage gradient can also be obtained without oscillating the standing-wave pattern by adding two voltages, one derived from the axial field and one derived from the radial field, since where the axial field is zero the radial field is at its maximum. The radial field produces a difference in voltage between two coils and this difference can be rectified and added to the voltage generated by the axial field.

Figure 6:
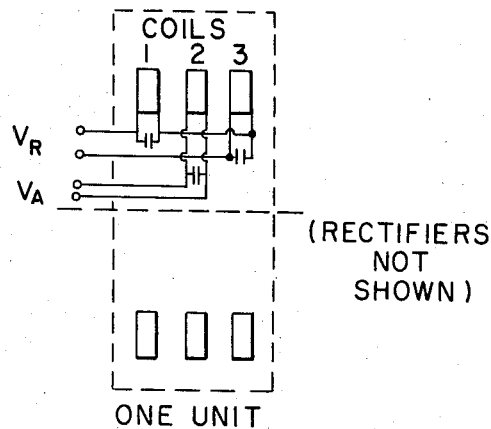
FIG. 6 is a partial schematic drawing of apparatus for obtaining a uniform voltage in accordance with this invention.
Figure 7:
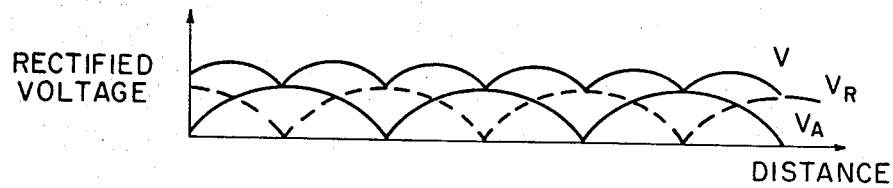
FIG. 7 is a graphic illustration of the rectified voltage of one embodiment of the apparatus of FIG. 4.

For the simplest embodiment outlying this idea, one unit in the string of resonance circuits can consist of three or more coils, each with a capacitor in parallel. A voltage derived from the axial field in the center is taken out from the middle coil or several coils in series in the middle of the circuits ($V_A$ in FIG. 6). A voltage proportional to the radial field is obtained by connecting the two outer coils in series inversing the leads from one of them ($V_R$ in FIG. 6). With amplitudes properly matched the resulting voltage distribution along the units of circuits will be as shown in FIG. 7.

Figure 8:
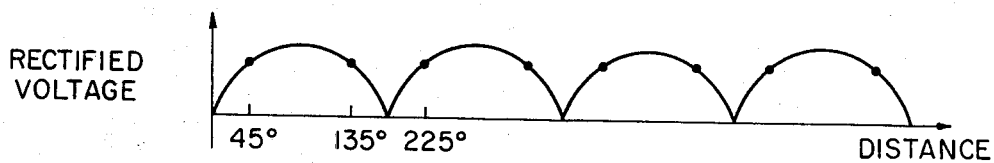
FIG. 8 is a graphic illustration of the rectified voltage of another embodiment of the apparatus of FIG. 4.

Likewise, in another embodiment, the standing-wave pattern is stationary and the power taken out at 45°, 135°, 225° etc., where the voltages are equal as shown in FIG. 8. In this embodiment, the frequency of the string 19 is chosen so that the wavelength of the transmitted voltage waves equals the length of four coil units and the string 19 is terminated with a reactive impedance that is chosen so that the standing wave pattern has a node between two coils 29. Thus, the induced voltage per turn of one coil 29 will vary from zero to maximum from one end of the coil to the other end thereof, from maximum to zero in the next coil 29, and so on. The result is that the total induced voltage in each coil 29 is very nearly the same, and a very uniform gradient results.

This invention has the advantage of providing an efficient, transmission line generator that produces a voltage gradient that is more uniform than was possible heretofore. As such this invention is an improvement over the transmission line generators known heretofore. In this regard, this invention provides novel apparatus and method, comprising a terminal, fixed or variable, reactive impedance for producing a standing wave pattern in the transmission line generator described in the above cited co-pending application.

What is claimed is:

1. In a transmission line generator having resonance circuits formed from LC circuits, rectifiers, and a terminal reactive impedance, the improvement, comprising a series of resonance circuits having capacitors connected to inductors forming an inner coil and an outer coil unit for preventing stray magnetic fields from penetrating the region outside the outer coil, whereby said circuits form a string of closely coupled resonance circuits for transmitting A.C. power from one end of said string to the other end thereof while said outer coil prevents inductive heating of the capacitors and the rectifiers for efficiently rectifying some of the A.C. to D.C. for building up a high voltage across said string.

2. The invention of claim 1 in which said terminal reactive impedance means is a rotating capacitor for producing a standing wave pattern that oscillates up and down said string.

3. The invention of claim 1 in which said terminal reactive impedance means comprises a vibrating relay that switches between two reactive impedances for producing a standing wave pattern that oscillates up and down said string.

4. The invention of claim 1 with one of the string of circuits, comprising an inner coil unit connected to one rectifier circuit and two outer coils connected in series in the opposite sense to another rectifier circuit, the two rectifier circuits being connected in series for obtaining a relatively uniform voltage gradient across said string.

References Cited

UNITED STATES PATENTS

| 3,014,170 | 12/1961 | Nygard | 321—15 |
| 3,175,104 | 3/1965 | Curtis. | |
| 3,234,428 | 2/1966 | Aiken | 315—51 X |
| 3,246,230 | 4/1966 | Cleland | 321—15 |

WILLIAM H. BEHA, Jr., Primary Examiner

U.S. Cl. X.R.
321—27; 328—233